United States Patent [19]

Escue et al.

[11] 4,444,402
[45] Apr. 24, 1984

[54] SEALING ASSEMBLY WITH ROTATABLE COLLAR

[76] Inventors: Jesse W. Escue, 1010 Buell Ave., Joliet, Ill. 60435; David L. Okon, 938 Surrey Ct., Joliet, Ill. 60436

[21] Appl. No.: 400,909

[22] Filed: Jul. 21, 1982

[51] Int. Cl.³ .............................................. F16J 15/34
[52] U.S. Cl. ............................... 277/93 R; 277/9; 277/82
[58] Field of Search ............... 277/81 R, 9, 82, 91, 277/93 R, 93 SD

[56] References Cited

U.S. PATENT DOCUMENTS

| | | | |
|---|---|---|---|
| 1,054,149 | 2/1913 | Tebbets | 277/93 R |
| 1,167,210 | 1/1916 | Orr | 277/93 R X |
| 2,322,867 | 6/1943 | Meyer | 277/93 R X |
| 2,460,746 | 2/1949 | Guthrie et al. | 277/91 X |
| 2,966,859 | 1/1961 | Salter et al. | 277/93 R X |
| 3,006,667 | 10/1961 | Stephens | 277/93 R X |
| 3,025,070 | 3/1962 | Copes | 277/93 R X |
| 3,081,098 | 3/1963 | Stephens | 277/93 R X |
| 3,116,066 | 12/1963 | Koppius | 277/9 X |
| 3,188,096 | 6/1965 | Wilkinson | 277/93 R X |
| 3,650,536 | 3/1972 | Shields | 277/93 SD |

FOREIGN PATENT DOCUMENTS

| | | | |
|---|---|---|---|
| 564370 | 9/1944 | United Kingdom | 277/93 R |
| 762950 | 12/1956 | United Kingdom | 277/93 R |

*Primary Examiner*—Robert S. Ward
*Attorney, Agent, or Firm*—Arnstein, Gluck, Lehr, Barron & Milligan

[57] ABSTRACT

A high pressure sealing assembly for a device having a rotatable shaft. The assembly includes a stationary seal member associated with the device which has an opening generally conforming to the rotatable shaft, a rotatable seal member adapted to be mounted on the rotatable shaft to engage and cooperate with the stationary seal member, and a rotatable seal collar adapted to be mounted on the rotatable shaft to engage and cooperate with the rotatable seal member. With this arrangement, the rotatable seal collar cooperates with the rotatable shaft to maintain the rotatable seal member in engagement with the stationary seal member.

16 Claims, 5 Drawing Figures

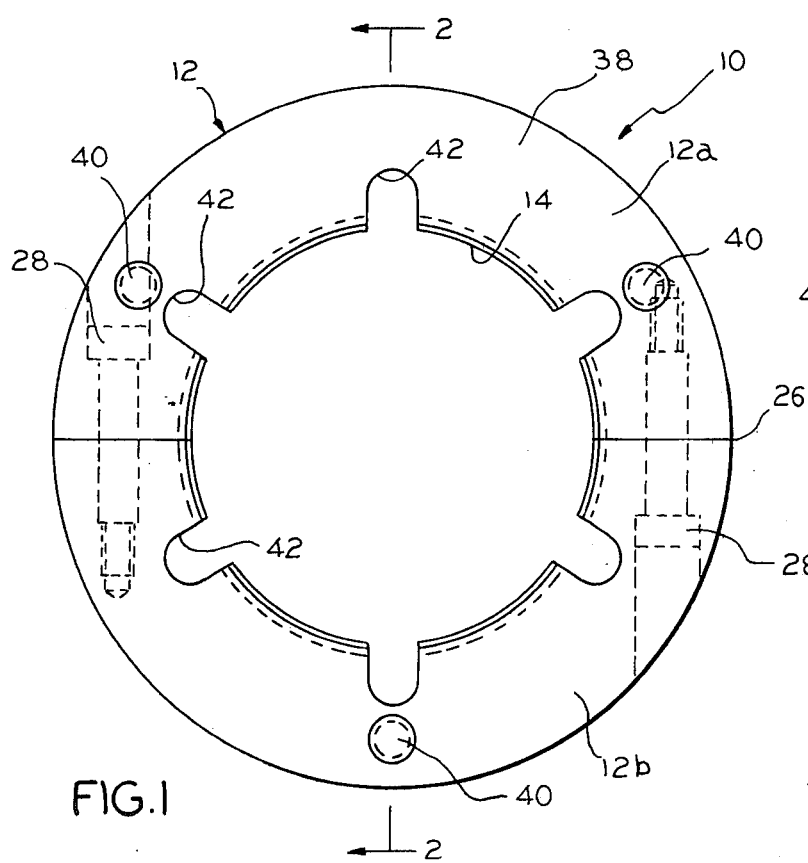
FIG.1
FIG.2
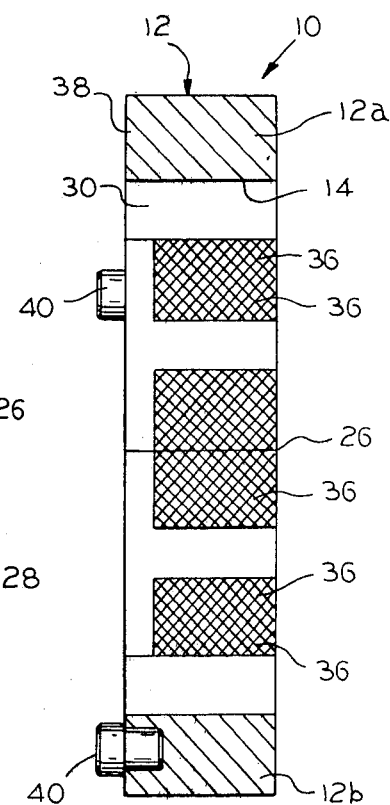
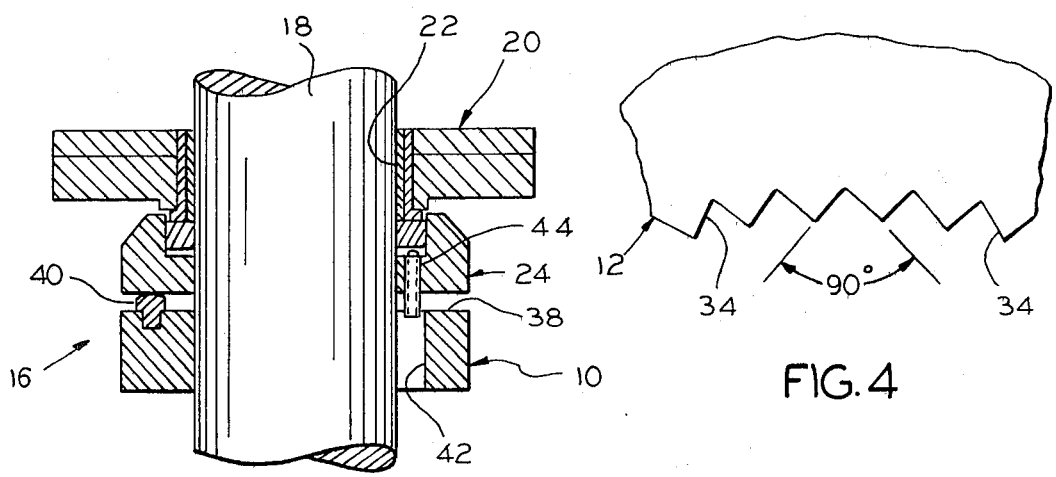
FIG.3
FIG.4
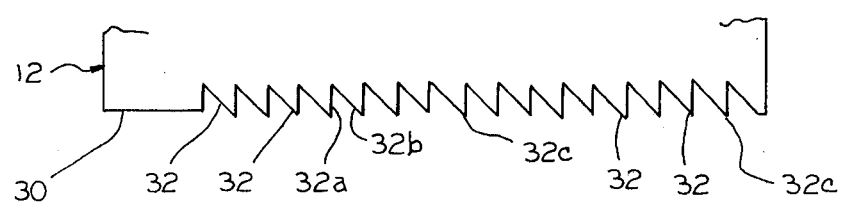
FIG.5

SEALING ASSEMBLY WITH ROTATABLE COLLAR

BACKGROUND OF THE INVENTION

The present invention is generally related to shaft seals and, more particularly, to a sealing assembly for rotatable shafts. Specifically, the present invention is directed to maintaining a rotatable seal member in engagement with a stationary seal member by utilizing a rotatable seal collar. In various types of machinery, it is continuously a problem to seal the opening through which a rotatable shaft protrudes. The problem is manifested in the difficulty of preventing leakage or loss of pressure or loss of vacuum while at the same time avoiding undue shaft friction. The shaft friction can generate heat, cause loss of power, and even damage the machinery. One method of effecting a seal at a joint between a stationary element and a rotatable shaft has been through the use of packing, stuffing, or the like. However, packing or stuffing causes considerable friction on the shaft. Another method of effecting a seal has been to utilize O-rings. However, O-rings have presented a problem due to the difficulty of providing a proper material to accommodate the wear thereon when utilized with shafts that operate at high speed. The shaft seals have also for the most part required the machinery to be stripped or dismantled for replacement purposes. The necessity for stripping or dismantling the machinery is most undesireable particularly where the machinery being sealed is large and heavy. Moreover, in order to replace conventional mechanical seals, the machinery must often times be shut down for prolonged periods of time resulting in enormous losses in productivity.

As a result, it has been recognized as desirable to provide the parts of a mechanical seal which are subject to wear in split fashion so that they can be easily mounted and later disassembled for repair or replacement purposes. This was successfully accomplished in my earlier U.S. Pat. No. 4,215,870 issued on Aug. 5, 1980, and in my earlier co-pending patent application U.S. Ser. No. 363,375 filed on Mar. 29, 1982, and seals manufactured according to my patent and patent application have been installed and proven to be highly effective not only in terms of their sealing capabilities but also in terms of their drastic reduction in down time of expensive machinery used in costly processes. With the features of the inventions of my earlier patent and patent application, a split-type seal has been provided which can be easily assembled and disassembled relative to machinery without interferring with the positioning or mounting of the stationary element and the rotatable shaft associated with it.

With attempts prior to my earlier patent and patent application to provide a split-type seal, it had been a problem to maintain a complete seal at all times completely about the rotatable shaft. During operation, the seals could easily become worn or deteriorated and the wear and deterioration could be non-uniform circumferentially about the shaft because of a number of reasons such as misalignment of the shaft with respect to the machinery with which it is used, or due to other factors. However, I was able to provide a sealing assembly which overcame the problem of non-uniform wearing or deterioration of the seal parts.

As set forth in my earlier co-pending patent application U.S. Ser. No. 363,375, I later became aware of still additional problems requiring a solution. For instance, sealing assemblies are often times needed in emergency situations. This is particularly true in applications which advantageously utilize the rotatable shaft seal disclosed and claimed in my earlier U.S. Pat. No. 4,215,870 where a seal is quickly needed on machinery used, for instance, in dangerous manufacturing process such as the grinding of caustic chemicals and the like where time is of the essence and the seal must be made available in the field on extremely short notice. However, the shafts of such machinery very significantly in size. Since time is of the essence in these applications, and it is not feasible to custom order a split seal from the manufacture, field service personnel have been required to stock a large variety of seals in order to be able to service a customer on a timely basis.

In my earlier patent application, I successfully overcame these problems with a unique sealing assembly, kit and method for rotatable shafts. This was done by providing a separate inserted adapted to be mounted in an insert-receiving opening in the stationary seal member wherein a shaft-receiving opening in the insert is initially dimensioned so as to be smaller than a rotatable shaft and is thereafter adapted to be enlarged in the field before use so as to generally conform to the rotatable shaft. With this arrangement, the sealing assembly is uniquely suited to be selectively supplied in kit form.

Despite the significant advances offered by my earlier patent and patent application, I have become aware of still other problems with shaft seals. In particular, and in high pressure environments, there can be a tendency for leakage resulting from a slight separation of the rotatable seal member from the stationary seal member since fluid under pressure has a tendency to overcome the frictional grip of the rotatable seal member on the rotatable shaft to thereby cause the rotatable seal member to slip on the shaft. While leakage is undesirable in any situation, it is entirely unacceptable in numerous applications where dangerous materials are involved.

The present invention is directed to solving the above and other problems while enhancing the effectiveness and versitility of the seals described in my earlier U.S. Pat. No. 4,215,870 and co-pending patent application U.S. Ser. No. 363,375.

SUMMARY OF THE INVENTION

Accordingly, it is a principal object of the present invention to provide a high pressure sealing assembly for a device having a rotatable shaft and, more particularly, an assembly adapted to maintain a rotatable seal member in engagement with a stationary seal member by utilizing a rotatable seal collar.

In the exemplary embodiment, a high pressure sealing assembly for a device having a rotatable shaft is provided. The assembly includes a stationary seal member associated with the device which has an opening generally conforming to the rotatable shaft, a rotatable seal member adapted to be mounted on the rotatable shaft to engage and cooperate with the stationary seal member, and a rotatable seal collar adapted to be mounted on the rotatable shaft to engage and cooperate with the rotatable seal member. With this arrangement, the rotatable seal collar cooperates with the rotatable shaft to maintain the rotatable seal member in engagement with the stationary seal member.

Preferably, the rotatable seal collar is split along a diameter and through a shaft-receiving opening so as to have two substantially identical collar portions. The rotatable seal collar includes means for securing the collar portions together and the shaft-receiving opening generally conforms to the rotatable shaft and is no larger than the rotatable shaft, the securing means thereby causing the collar portions to grip the rotatable shaft. Moreover, the shaft-receiving opening is defined by a shaft-conforming surface advantageously having means for resisting movement along the rotatable shaft.

Specifically, the movement resisting means includes a plurality of circumferentially extending teeth formed in the shaft-conforming surface. The teeth are preferably each definded by a radially extending face and an angularly disposed face, the angularly disposed face extending toward the rotatable shaft in a direction away from the rotatable seal member, and extending inwardly to form a circumferential edge with a next adjacent radially extending face. Advantageously, the circumferential edges have a radial dimension slightly less than the radical dimension of the rotatable shaft. In addition, the movement resisting means advantageously includes a plurality of axially extending grooves formed in the shaft-conforming surface. The grooves are each defined by a pair of angularly disposed surfaces extending along the rotatable shaft in an axial direction, the angularly disposed surfaces each extending inwardly to form an axial edge with the next adjacent angularly disposed surface. With this arrangement, the axial edges preferably have a radial dimension slightly less than the radial dimension of the rotatable shaft.

Still other features of the invention include the rotatable seal collar having a circumferential face adapted to be disposed in confronting relation to the rotatable seal member. Advantageously, the circumferential face is provided with spacer means such as spherical locater buttons, adapted to be disposed in engagement with the rotatable seal member. In a preferred embodiment, a plurality of spherical locator buttons are provided in a radially disposed fashion about the circumferential face.

BRIEF DESCRIPTION OF THE DRAWINGS

In the drawings:

FIG. 1 is a front elevational view of a rotatable seal collar for a sealing assembly having rotatable seal means in engagement with stationary seal means in accordance with the present invention;

FIG. 2 is a cross sectional view of the rotatable seal collar of FIG. 1 taken on line 2—2;

FIG. 3 is a partial cross sectional view of a high pressure sealing assembly utilizing a stationary seal member, a rotatable seal member, and a rotatable seal collar taken along the axis of a rotatable shaft;

FIG. 4 is an enlarged schematic view of the axially extending grooves in the rotatable seal collar; and FIG. 5 is an enlarged schematic view of the circumferentially extending teeth in the rotatable seal collar.

DETAILED DESCRIPTION OF THE PREFERRED EMBODIMENT

Referring to the drawings, and first to FIG. 1, the reference numeral 10 designates generally a rotatable seal collar for a sealing assembly having rotatable seal means in engagement with stationary seal means. The rotatable seal collar 10 includes a collar body 12 having a shaft-receiving opening 14 therein generally conforming to a rotatable shaft passing through the stationary seal means and the rotatable seal means. The collar body 12 is adapted to engage and cooperate with the rotatable seal means. The rotatable seal collar 10 also includes means for securing the collar body 12 to the rotatable shaft so as to maintain the rotatable seal means in engagement with the stationary seal means. As will be appreciated hereinafter, the securing means causes the collar body to move with the rotatable shaft while resisting movement along the rotatable shaft.

Referring now to FIG. 3, the rotatable seal collar 10 is particularly adapted for use in a high pressure sealing assembly 16 for a device having a rotatable shaft 18. The assembly 16 then includes stationary seal means 20 associated with the device and having an opening 22 generally conforming to the rotatable shaft 18, rotatable seal means 24 adapted to be mounted on the rotatable shaft 18 to engage and cooperate with the stationary seal means 20, and the rotatable seal collar 10 which is adapted to be mounted on the rotatable shaft 18 to engage and cooperate with the rotatable seal means 24. With this arrangement, the rotatable seal collar 10 cooperates with the rotatable shaft 18 to maintain the rotatable seal means 24 in engagement with the stationary seal means 20.

As shown in FIG. 1, the rotatable seal collar 10 is split through the shaft-receiving opening 14 (as at 26), preferably along a diameter, to as to include two substantially identical collar portions 12a and 12b. It will also be seen that the rotatable seal collar 10 includes means for securing the collar portions 12a and 12b together, such as the bolts 28, which also comprise a portion of the means for securing the collar body 12 to the rotatable shaft 18, as previously described. As will be appreciated, the shaft-receiving opening 14 is dimensioned no larger than the rotatable shaft 18, and the bolts 28 not only secure the collar portions 12a and 12b together, but also cause the collar portions 12a and 12b to grip the rotatable shaft 18.

As suggested above, the shaft-receiving opening 14 is defined, at least in part, by a shaft-conforming surface 30 having means for resisting movement along the rotatable shaft 18 in an axial direction, such as a plurality of circumferentially extending teeth 32 (see FIG. 5). The circumferentially extending teeth 32, which are formed in the shaft-conforming surface 30, are each defined by a radially extending face 32a and an angularly disposed face 32b extending toward the rotatable shaft 18 in a direction away from the rotatable seal means 24, the annularly disposed faces 32b each extending inwardly to form a circumferential edge 32c with a next adjacent radially extending face 32a such that diametrically opposed edges 32c have a diameter slightly less than the diameter of the rotatable shaft 18. Additionally, in a preferred embodiment, the angularly disposed faces 32b each extend at an angle to the next adjacent radially extending face 32a of approximately 45° and the circumferential edges 32c each have a radial dimension on the order of approximately 0.002 to 0.003 inches less than the radical dimension of the rotatable shaft 18.

Referring now to FIG. 4, the shaft-conforming surface 30 may include means for resisting movement along the rotatable shaft 18 in an axial direction such as a plurality of axially extending grooves 34. The axially extending grooves 34 are each defined by a pair of oppositely angularly disposed surfaces 34a and 34b extending along the rotatable shaft in an axial direction, the angularly disposed surfaces 34a and 34b each extending inwardly to form an axial edge 34c with a next adjacent angularly disposed surface having a radial dimension slightly less than the radial dimension of the rotatable shaft 18. Specifically, in a preferred embodiment, the angularly disposed surfaces 34a and 34b intersect at an angle of approximately 90° and the axial edges 34c each have a radial dimension on the order of approximately 0.002 to 0.003 inches less than the radial dimension of the rotatable shaft 18.

As will be appreciated from FIG. 2, in a preferred embodiment, the rotatable seal collar 10 includes both a plurality of circumferentially extending teeth 32 and a plurality of axially extending grooves 34. While it is possible for the rotatable seal collar 10 to operate with either a smooth surface (with a frictional interference fit), a surface having circumferentially extending teeth, or a surface having axially extending grooves, it is believed most advantageous for the shaft-conforming surface 30 to include not only a plurality of circumferentially extending teeth 32, but also a plurality of axially extending grooves 34. With this arrangement, as schematically illustrated in FIG. 2, the intersection of the circumferentially extending teeth 32 with the axially extending grooves 34 form a plurality of radially inwardly and rearwardly directed points 36.

As will be appreciated, the points 36 are adapted to bite into the rotatable shaft 18 inasmuch as diametrically opposed points 36 will be separated by a diameter slightly less than the diameter of the rotatable shaft 18, i.e., on the order of approximately 0.002 to 0.003 inches less. When the bolts 28 are tightened to secure the collar portions 12a and 12b together about the rotatable shaft 18, the radially inwardly directed points 36 will bite into the rotatable shaft 18 and will effectively prevent the rotatable seal collar 10 from slipping axially along the rotatable shaft 18.

Referring to FIGS. 1 through 3, the rotatable seal collar 10 includes a circumferential face 38 adapted to be disposed in confronting relation to the rotatable seal means 24. The circumferential face 38 is advantageously provided with spacer means adapted to be disposed in engagement with the rotatable seal means 24 (see FIG. 3). Preferably, the spacer means comprises a plurality of spherical locator buttons 40 radially disposed about the circumferential face 38.

Still referring to FIGS. 1 through 3, the rotatable seal collar 10 may advantageously include a plurality of genrally U-shaped notches 42. The notches 42 are provided in the embodiment illustrated to receive the projecting portions of the spring plunger assemblies 44 in the rotatable seal means 24. As can be seen in FIG. 3, the spring plunger assemblies 44 can be adjusted through the notches 42 without removing the rotatable seal collar 10 from the rotatable shaft 18.

While the notches 42 have been illustrated, it will be appreciated that they are not essential. It is contemplated, for instance, that the rotatable seal collar 10 will have much wider ranging applicability than for use only with my earlier U.S. Pat. No. 4,215,870 and my earlier co-pending patent application U.S. Ser. No. 363,375, and, while the rotatable seal collar 10 is particularly adapted for use in high pressure sealing assemblies, it may be used in any sealing assembly where its benefits could be of value. Accordingly, while I have illustrated the rotatable seal collar 10 in use with my earlier invention, it will be appreciated that the advantages to be derived from using the rotatable seal collar 10 may be enjoyed by anyone having a seal on a shaft.

While in the foregoing specification a detailed description of the invention has been set forth for purposes of illustration, it will be appreciated by those skilled in the art that the details herein given may be varied without departing from the spirit and scope of the invention.

What is claimed is:

1. A high pressure sealing assembly for a device having a rotatable shaft, comprising:

stationary seal means associated with said device and having an opening generally conforming to said rotatable shaft;

rotatable seal means adapted to be mounted on said rotatable shaft to engage and cooperate with said stationary seal means;

a rotatable seal collar adapted to be mounted on said rotatable shaft to engage and cooperate with said rotatable seal means;

said rotatable seal collar cooperating with said rotatable shaft to maintain said rotatable seal means in engagement with said stationary seal means, said rotatable seal collar including a shaft-receiving opening therein and being split through said shaft-receiving opening along a diameter thereof, said shaft-receiving opening being defined by a shaft-conforming surface having means for resisting movement along said rotatable shaft, said movement resisting means including means for biting into the surface of said rotatable shaft, said surface biting means having a radial dimension slightly less than the radial dimension of said rotatable shaft; and means for securing said diametrically split portions of said rotatable seal collar together so as to cause said surface biting means to bite into the surface of said rotatable shaft.

2. The high pressure sealing assembly as defined by claim 1 wherein said rotatable seal collar includes two substantially identical collar portions.

3. The high pressure sealing assembly as defined by claim 1 wherein said surface biting means includes a plurality of circumferentially extending teeth, said teeth being formed in said shaft-conforming surface.

4. The high pressure sealing assembly as defined by claim 3 wherein said teeth are each defined by a radially extending face and an angularly disposed face, said angularly disposed faces extending toward said rotatable shaft in a direction away from said rotatable seal means.

5. The high pressure sealing assembly as defined by claim 4 wherein said angularly disposed faces each extend inwardly to form a circumferential edge with a next adjacent radially extending face, said circumferential edges having a diameter slightly less than the diameter of said rotatable shaft.

6. The high presssure sealing assembly as defined by claim 5 wherein said angularly disposed faces each extend at an angle to the next adjacent radially extending face of approximately 45°, said circumferential edges have a radial dimension on the order of approximately 0.002 to 0.003 inches less than the radial dimension of said rotatable shaft.

7. The high pressure sealing assembly as defined by claim 1 wherein said surface biting means includes a plurality of axially extending grooves, said grooves being formed in said shaft-conforming surface.

8. The high pressure sealing assembly as defined by claim 7 wherein said grooves are each defined by a pair of angularly disposed surfaces, said angularly disposed surfaces extending along said rotatable shaft.

9. The high pressure sealing assembly as defined by claim 8 wherein said angularly disposed surfaces each extend inwardly to form an axial edge with a next adjacent angularly disposed surface, said axial edges having a radial dimension slightly less than the radial dimension of said rotatable shaft.

10. The high pressure sealing assembly as defined by claim 9 wherein said angularly disposed surfaces defining said grooves intersect at an angle of approximately 90°, said axial edges each having a radial dimension on the order of approximately 0.002 to 0.003 inches less than the radial dimension of said rotatable shaft.

11. The high pressure sealing assembly as defined by claim 1 wherein said rotatable seal collar includes a circumferential face adapted to be disposed in confronting relation to said rotatable seal means, said circumferential face being provided with spacer means adapted to be disposed in engagement with said rotatable seal means.

12. The high pressure sealing assembly as defined by claim 11 wherein said spacer means includes a plurality of spherical locator buttons, said locator buttons being radially disposed about said circumferential face.

13. A rotatable seal collar for a sealing assembly having rotatable seal means in engagement with stationary seal means, comprising:
  a collar body having a shaft-receiving opening therein, said shaft-receiving opening generally conforming to a rotatable shaft passing through said stationary seal means and said rotatable seal means and including means for resisting movement along said rotatable shaft, said movement resisting means including means for biting into the surface of said rotatable shaft, said surface biting means having a radial dimension slightly less than the radial dimension of said rotatable shaft, said collar body being split through said shaft-receiving opening along a diameter thereof and being adapted to engage and cooperate with said rotatable seal means; and
  means for securing said collar body to said rotatable shaft for movement therewith, said securing means being operable to maintain said rotatable seal means in engagement with said stationary seal means, said securing means enabling said collar body to resist movement along said rotatable shaft by causing said surface biting means to bite into the surface of said rotatable shaft.

14. The rotatable seal collar as defined by claim 13 wherein said shaft-receiving opening is defined by a shaft-conforming surface.

15. The rotatable seal collar as defined by claim 14 wherein said surface biting means includes a plurality of circumferentially extending teeth formed in said shaft-conforming surface.

16. The rotatable seal collar as defined by claim 15 wherein said surface biting means also includes a plurality of axially extending grooves in said shaft-conforming surface.

* * * * *